US009792845B2

(12) United States Patent
Xiao et al.

(10) Patent No.: US 9,792,845 B2
(45) Date of Patent: Oct. 17, 2017

(54) SCAN DRIVING CIRCUIT

(71) Applicant: WUHAN CHINA STAR OPTOELECTRONICS TECHNOLOGY CO. LTD., Hubei (CN)

(72) Inventors: Juncheng Xiao, Guangdong (CN); Mang Zhao, Guangdong (CN); Yao Yan, Guangdong (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 113 days.

(21) Appl. No.: 14/777,748

(22) PCT Filed: Jul. 17, 2015

(86) PCT No.: PCT/CN2015/084279
§ 371 (c)(1),
(2) Date: Sep. 17, 2015

(87) PCT Pub. No.: WO2016/192178
PCT Pub. Date: Dec. 8, 2016

(65) Prior Publication Data

US 2016/0358564 A1 Dec. 8, 2016

(30) Foreign Application Priority Data

Jun. 4, 2015 (CN) .......................... 2015 1 0304159

(51) Int. Cl.
*G09G 3/36* (2006.01)
*G06F 3/038* (2013.01)
(Continued)

(52) U.S. Cl.
CPC ....... *G09G 3/20* (2013.01); *G09G 2300/0408* (2013.01); *G09G 2310/0267* (2013.01)

(58) Field of Classification Search
CPC ......... G09G 2310/0286; G09G 3/3648; G09G 3/3677; G09G 3/20
See application file for complete search history.

(56) References Cited

U.S. PATENT DOCUMENTS

2006/0007085 A1* 1/2006 Kim ....................... G11C 19/28 345/87
2011/0142191 A1* 6/2011 Tobita .................. G09G 3/3677 377/64
(Continued)

FOREIGN PATENT DOCUMENTS

CN 104078019 10/2014
CN 104485079 4/2015
(Continued)

*Primary Examiner* — Alexander Eisen
*Assistant Examiner* — Nan-Ying Yang
(74) *Attorney, Agent, or Firm* — Mark M. Friedman

(57) ABSTRACT

A scan driving circuit is provided for driving scan lines which are connected in series, including a pull-down controlling module, a pull-down module, a reset-controlling module, a resetting module, a downward-transmitting module, a first bootstrap capacitor, a constant low voltage level source, and a constant high voltage level source. The entire structure of the scan driving circuit is simple, and energy consumption is reduced.

12 Claims, 4 Drawing Sheets

(51) Int. Cl.
*G09G 5/00* (2006.01)
*G09G 3/20* (2006.01)

(56) References Cited

U.S. PATENT DOCUMENTS

| | | | |
|---|---|---|---|
| 2016/0180788 | A1 | 6/2016 | Xiao |
| 2016/0189647 | A1 | 6/2016 | Xiao et al. |
| 2016/0189648 | A1 | 6/2016 | Xiao |
| 2016/0247442 | A1 | 8/2016 | Dai et al. |
| 2016/0267832 | A1 | 9/2016 | Dai |

FOREIGN PATENT DOCUMENTS

| | | |
|---|---|---|
| CN | 104505049 | 4/2015 |
| CN | 104537992 | 4/2015 |
| CN | 104575420 | 4/2015 |

* cited by examiner

SCAN DRIVING CIRCUIT

FIELD OF THE INVENTION

The present invention relates to the field of display drivers, and more particularly to a scan driving circuit.

BACKGROUND OF THE INVENTION

Gate driver on array (GOA) is a technology in which a scan driving circuit is formed on an array substrate of a conventional thin film transistor liquid crystal display in order to implement a driving manner that scan lines are scanned row by row. The conventional scan driving circuit comprises a pull-down controlling module, a pull-down module, a downward-transmitting module, a reset-controlling module, a bootstrap capacitor, and a reset-controlling module.

When the scan driving circuit works under high temperatures, the problem of time delays and current leakage may occur, thereby influencing the reliability of the scan driving circuit.

Accordingly, it is necessary to provide a scan driving circuit to solve the technical problem in the prior art.

SUMMARY OF THE INVENTION

An object of the present invention is to provide a scan driving circuit which has a simple structure and high reliability so as to solve the technical problems that the conventional scan driving circuit has a complex structure and low reliability.

In order to solve the above-mentioned problems, the technical solution of the present invention is as follows:

The present invention provides a scan driving circuit for driving scan lines connected in series, comprising:

A pull-down controlling module is used for receiving a scan signal from a former stage and generating a scan voltage signal having a low voltage level with respect to a scan line according to the scan signal from the former stage.

A pull-down module is used for pulling down the scan signal with respect to the scan line according to the scan voltage signal.

A reset-controlling module is used for receiving a clock signal from a next stage and generating a reset signal with respect to the scan line according to the clock signal from the next stage.

A resetting module is used for pulling up the scan signal with respect to the scan line according to the reset signal.

A downward-transmitting module is used for generating and transmitting a clock signal of a current stage and a pull-down controlling signal of the current stage according to the scan signal of the scan line.

A first bootstrap capacitor is used for generating the scan voltage signal either having the low voltage level or a high voltage level of the scan line.

A constant low voltage level source is used for providing a low voltage level signal.

A constant high voltage level source is used for providing a high voltage level signal.

Either P-type metal-oxide semiconductor transistors or N-type metal-oxide semiconductor transistors are utilized in the scan driving circuit to control the pull-down controlling module, the pull-down module, the reset-controlling module, and the resetting module.

The pull-down controlling module is also used for receiving a scan signal from the next stage and generating the scan voltage signal having the low voltage level with respect to the scan line according to the scan signal from the next stage.

The reset-controlling module is also used for receiving a clock signal from the former stage and generating the reset signal with respect to the scan line according to the clock signal from the former stage.

In the scan driving circuit of the present invention, the pull-down controlling module comprises a first transistor. A scan signal having a low voltage level is inputted into a control end of the first transistor. The scan signal from the former stage is inputted into an input end of the first transistor. An output end of the first transistor is connected with the pull-down module.

In the scan driving circuit of the present invention, the pull-down module comprises a second transistor. A control end of the second transistor is connected with the output end of the first transistor of the pull-down controlling module. An input end of the second transistor is connected with the output end of the first transistor of the pull-down controlling module. The scan voltage signal having the low voltage level of the scan line is outputted by an output end of the second transistor.

In the scan driving circuit of the present invention, the reset-controlling module comprises a third transistor. The scan signal having the low voltage level is inputted into a control end of the third transistor. The clock signal from the next stage is inputted into an input end of the third transistor. The reset signal of the scan line is outputted by an output end of the third transistor.

In the scan driving circuit of the present invention, the resetting module comprises a fourth transistor, a fifth transistor, a sixth transistor, and a seventh transistor.

A control end of the fourth transistor is connected with the output end of the third transistor. An input end of the fourth transistor is connected with the constant low voltage level source. An output end of the fourth transistor is respectively connected with a control end of the fifth transistor, a control end of the seventh transistor, and an output end of the sixth transistor.

An input end of the fifth transistor is connected with the constant high voltage level source. An output end of the fifth transistor is connected with the output end of the second transistor.

A control end of the sixth transistor is connected with the output end of the second transistor. An input end of the sixth transistor is connected with the constant high voltage level source.

An input end of the seventh transistor is connected with the constant high voltage level source. The scan signal of the current stage of the scan line is outputted by an output end of the seventh transistor.

In the scan driving circuit of the present invention, the downward-transmitting module comprises an eighth transistor. A control end of the eighth transistor is connected with the output end of the second transistor. An input end of the eighth transistor is connected with the output end of the seventh transistor. The clock signal of current stage is outputted by an output end of the eighth transistor.

In the scan driving circuit of the present invention, the downward-transmitting module further comprises a tenth transistor. A control end of the tenth transistor is connected with the output end of the second transistor. An input end of the tenth transistor is connected with the output end of the eighth transistor. The pull-down controlling signal of the current stage is outputted by an output end of the tenth transistor.

In the scan driving circuit of the present invention, an end of the first bootstrap capacitor is connected with the output end of the second transistor. Another end of the first bootstrap capacitor is connected with the output end of the seventh transistor.

In the scan driving circuit of the present invention, the scan driving circuit further comprises an electric leakage-preventive module. The electric leakage-preventive module comprises a ninth transistor. A control end of the ninth transistor is connected with the constant low voltage level source. An input end of the ninth transistor is connected with the output end of the second transistor. An output end of the ninth transistor is connected with the output end of the seventh transistor via the first bootstrap capacitor.

In the scan driving circuit of the present invention, the resetting module further comprises a second bootstrap capacitor. An end of the second bootstrap capacitor is connected with the constant high voltage level source. Another end of the second bootstrap capacitor is connected with the output end of the fourth transistor.

The present invention also provides a scan driving circuit for driving scan lines connected in series, comprising:

A pull-down controlling module is used for receiving the scan signal from a former stage and generating a scan voltage signal having a low voltage level with respect to a scan line according to the scan signal from the former stage.

A pull-down module is used for pulling down a scan signal with respect to the scan line according to the scan voltage signal.

A reset-controlling module is used for receiving a clock signal from a next stage and generating a reset signal with respect to the scan line according to the clock signal from the next stage.

A resetting module is used for pulling up the scan signal with respect to the scan line according to the reset signal.

A downward-transmitting module is used for generating and transmitting a clock signal of a current stage and a pull-down controlling signal of the current stage according to the scan signal of the scan line.

A first bootstrap capacitor is used for generating the scan voltage signal either having the low voltage level or a high voltage level of the scan line.

A constant low voltage level source is used for providing a low voltage level signal.

A constant high voltage level source is used for providing a high voltage level signal.

In the scan driving circuit of the present invention, the pull-down controlling module comprises a first transistor. A scan signal having a low voltage level is inputted into a control end of the first transistor. The scan signal from the former stage is inputted into an input end of the first transistor. An output end of the first transistor is connected with the pull-down module.

In the scan driving circuit of the present invention, the pull-down module comprises a second transistor. A control end of the second transistor is connected with the output end of the first transistor of the pull-down controlling module. An input end of the second transistor is connected with the output end of the first transistor of the pull-down controlling module. The scan voltage signal having the low voltage level of the scan line is outputted by an output end of the second transistor.

In the scan driving circuit of the present invention, the reset-controlling module comprises a third transistor. The scan signal having the low voltage level is inputted into a control end of the third transistor. The clock signal from the next stage is inputted into an input end of the third transistor. The reset signal of the scan line is outputted by an output end of the third transistor.

In the scan driving circuit of the present invention, the resetting module comprises a fourth transistor, a fifth transistor, a sixth transistor, and a seventh transistor.

A control end of the fourth transistor is connected with the output end of the third transistor. An input end of the fourth transistor is connected with the constant low voltage level source. An output end of the fourth transistor is respectively connected with a control end of the fifth transistor, a control end of the seventh transistor, and an output end of the sixth transistor.

An input end of the fifth transistor is connected with the constant high voltage level source. An output end of the fifth transistor is connected with the output end of the second transistor.

A control end of the sixth transistor is connected with the output end of the second transistor. An input end of the sixth transistor is connected with the constant high voltage level source.

An input end of the seventh transistor is connected with the constant high voltage level source. The scan signal of the current stage of the scan line is outputted by an output end of the seventh transistor.

In the scan driving circuit of the present invention, the downward-transmitting module comprises an eighth transistor. A control end of the eighth transistor is connected with the output end of the second transistor. An input end of the eighth transistor is connected with the output end of the seventh transistor. The clock signal of current stage is outputted by an output end of the eighth transistor.

In the scan driving circuit of the present invention, the downward-transmitting module further comprises a tenth transistor. A control end of the tenth transistor is connected with the output end of the second transistor. An input end of the tenth transistor is connected with the output end of the eighth transistor. The pull-down controlling signal of the current stage is outputted by an output end of the tenth transistor.

In the scan driving circuit of the present invention, an end of the first bootstrap capacitor is connected with the output end of the second transistor. Another end of the first bootstrap capacitor is connected with the output end of the seventh transistor.

In the scan driving circuit of the present invention, the scan driving circuit further comprises an electric leakage-preventive module. The electric leakage-preventive module comprises a ninth transistor. A control end of the ninth transistor is connected with the constant low voltage level source. An input end of the ninth transistor is connected with the output end of the second transistor. An output end of the ninth transistor is connected with the output end of the seventh transistor via the first bootstrap capacitor.

In the scan driving circuit of the present invention, the resetting module further comprises a second bootstrap capacitor. An end of the second bootstrap capacitor is connected with the constant high voltage level source. Another end of the second bootstrap capacitor is connected with the output end of the fourth transistor.

In comparison to the prior art, the scan driving circuit of the present invention can increase the reliability and simplify the structure by setting the pull-down controlling module and the reset-controlling module so as to solve the technical problems that the conventional scan driving circuit has a complex structure and low reliability.

In order to make the present invention more clear, preferred embodiments and the drawings thereof are described in detail below.

DETAILED DESCRIPTION OF THE INVENTION

Figure 1:
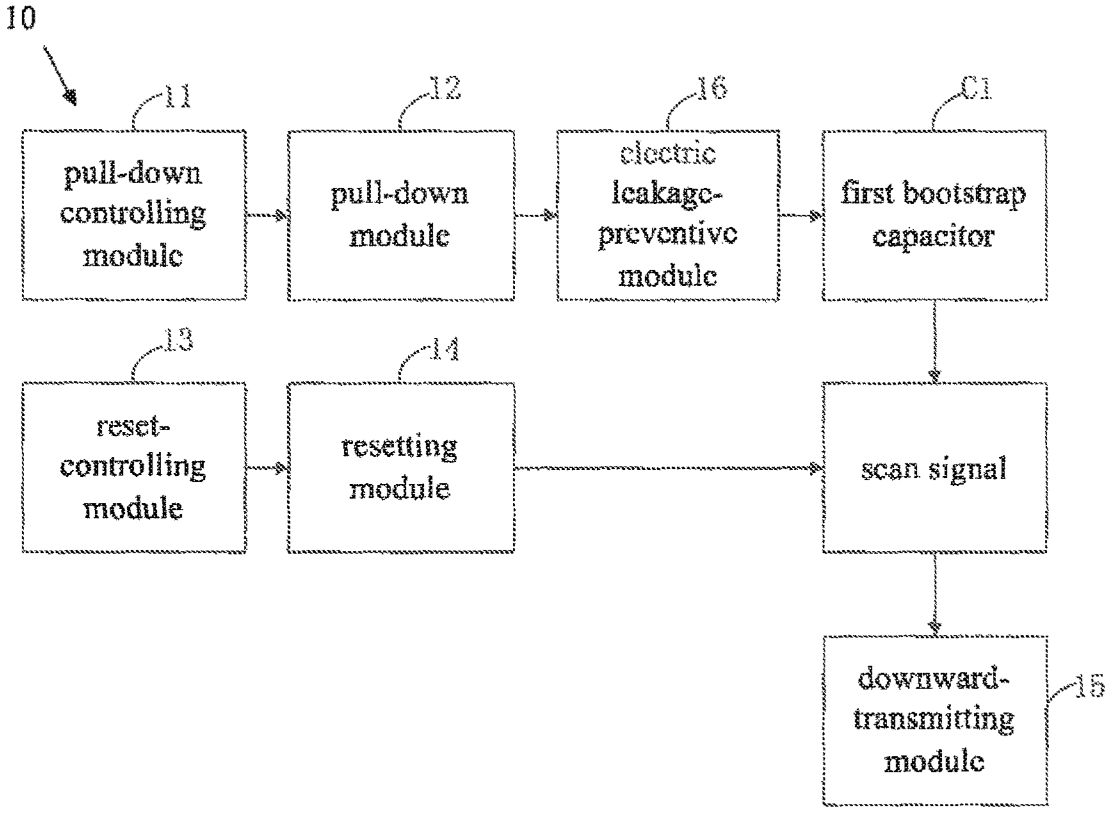
FIG. 1 is a structure diagram of a scan driving circuit of a preferable embodiment of the present invention.

The following embodiments refer to the accompanying drawings for exemplifying specific implementable embodiments of the present invention. Furthermore, directional terms described by the present invention, such as upper, lower, front, back, left, right, inner, outer, side, etc., are only directions by referring to the accompanying drawings, and thus the used directional terms are used to describe and understand the present invention, but the present invention is not limited thereto.

In the drawings, the same reference symbol represents the same or a similar component.

Please refer to FIG. 1, which shows a structure diagram of a scan driving circuit of a preferable embodiment of the present invention. In the preferable embodiment of the present invention, the scan driving circuit 10 is used for driving scan lines which are connected in series. The scan driving circuit 10 comprises a pull-down controlling module 11, a pull-down module 12, a reset-controlling module 13, a resetting module 14, a downward-transmitting module 15, an electric leakage-preventive module 16, a first bootstrap capacitor C1, a constant low voltage level source VGL, and a constant high voltage level source VGH.

The pull-down controlling module 11 is used for receiving a scan signal G_N−1 from a former stage and generating a scan voltage signal having a low voltage level with respect to a scan line according to the scan signal G_N−1 from the former stage. The pull-down module 12 is used for pulling down a scan signal G_N with respect to the scan line according to the scan voltage signal. The reset-controlling module 13 is used for receiving a clock signal CK_N+1 from a next stage and generating a reset signal with respect to the scan line according to the clock signal CK_N+1 from the next stage. The resetting module 14 is used for pulling up the scan signal G_N with respect to the scan line according to the reset signal. The downward-transmitting module is used for generating and transmitting a clock signal CK_N of a current stage according to the scan signal G_N of the scan line. The first bootstrap capacitor C1 is used for generating the scan voltage signal either having the low voltage level or a high voltage level of the scan line. The constant low voltage level source VGL is used for providing a low voltage level signal. The constant high voltage level source VGH is used for providing a high voltage level signal.

Figure 2:
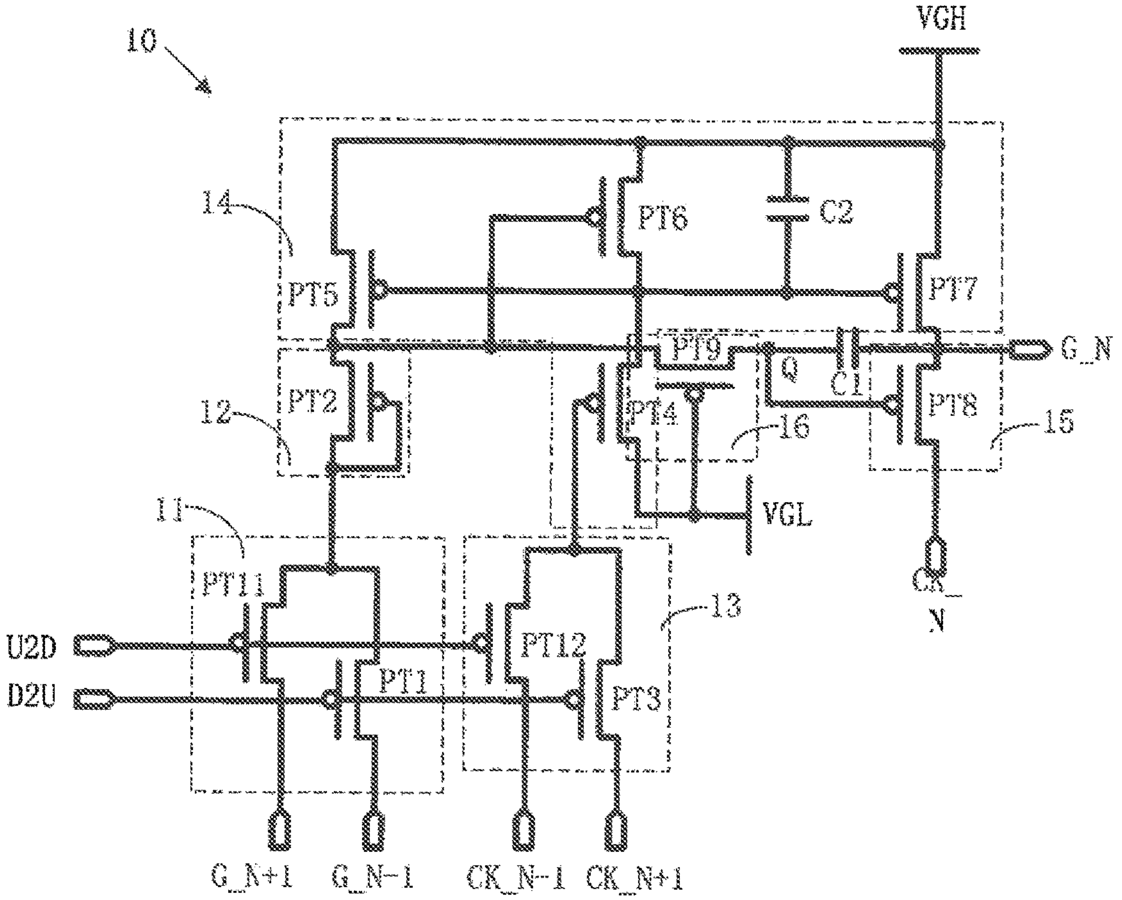
FIG. 2 is a circuit structure diagram of the scan driving circuit of a first preferable embodiment of the present invention.

Please refer to FIG. 2, which is a circuit structure diagram of the scan driving circuit of a first preferable embodiment of the present invention. In this preferable embodiment, the pull-down controlling module 11 comprises a first transistor PT1.

A scan signal D2U having a low voltage level is inputted into a control end of the first transistor PT1. The scan signal G_N−1 from the former stage is inputted into an input end of the first transistor PT1. An output end of the first transistor PT1 is connected with the pull-down module 12 for inputting the scan signal G_N−1 from the former stage to the pull-down module 12.

The pull-down module 12 comprises a second transistor PT2. A control end of the second transistor PT2 is connected with the output end of the first transistor PT1. An input end of the second transistor PT2 is connected with the output end of the first transistor PT1. The scan voltage signal G_N−1 having the low voltage level of the scan line is outputted by an output end of the second transistor PT2.

The reset-controlling module 13 comprises a third transistor PT3. The scan signal D2U having the low voltage level is inputted into a control end of the third transistor PT3. The clock signal CK_N+1 from the next stage is inputted into an input end of the third transistor PT3. The reset signal of the scan line (i.e., the clock signal CK_N+1 of next stage) is outputted by an output end of the third transistor PT3.

The resetting module 14 comprises a fourth transistor PT4, a fifth transistor PT5, a sixth transistor PT6, a seventh transistor PT7, and a second bootstrap capacitor C2. A control end of the fourth transistor PT4 is connected with the output end of the third transistor PT3. An input end of the fourth transistor PT4 is connected with the constant low voltage level source VGL. An output end of the fourth transistor PT4 is respectively connected with a control end of the fifth transistor PT5, a control end of the seventh transistor PT7, and an output end of the sixth transistor PT6.

An input end of the fifth transistor PT5 is connected with the constant high voltage level source VGH. An output end of the fifth transistor PT5 is connected with the output end of the second transistor PT2.

A control end of the sixth transistor PT6 is connected with the output end of the second transistor PT2. An input end of the sixth transistor PT6 is connected with the constant high voltage level source VGH.

An input end of the seventh transistor PT7 is connected with the constant high voltage level source VGH. The scan signal G_N of the current stage is outputted by an output end of the seventh transistor PT7.

An end of the second bootstrap capacitor C2 is connected with the constant high voltage level source VGH. Another end of the second bootstrap capacitor C2 is connected with the output end of the fourth transistor PT4.

The downward-transmitting module 15 comprises an eighth transistor PT8. A control end of the eighth transistor PT8 is connected with the output end of the second transistor PT2. An input end of the eighth transistor PT8 is connected with the output end of the seventh transistor PT7. The clock signal CK_N of current stage is outputted by an output end of the eighth transistor PT8.

An end of the first bootstrap capacitor C1 is connected with the output end of the second transistor PT2. Another end of the first bootstrap capacitor C1 is connected with the output end of the seventh transistor PT7.

The electric leakage-preventive module 16 comprises a ninth transistor PT9. A control end of the ninth transistor PT9 is connected with the constant low voltage level source VGL. An input end of the ninth transistor PT9 is connected with the output end of the second transistor PT2. An output end of the ninth transistor PT9 is connected with the output end of the seventh transistor PT7 via the first bootstrap capacitor C1.

Figure 4:
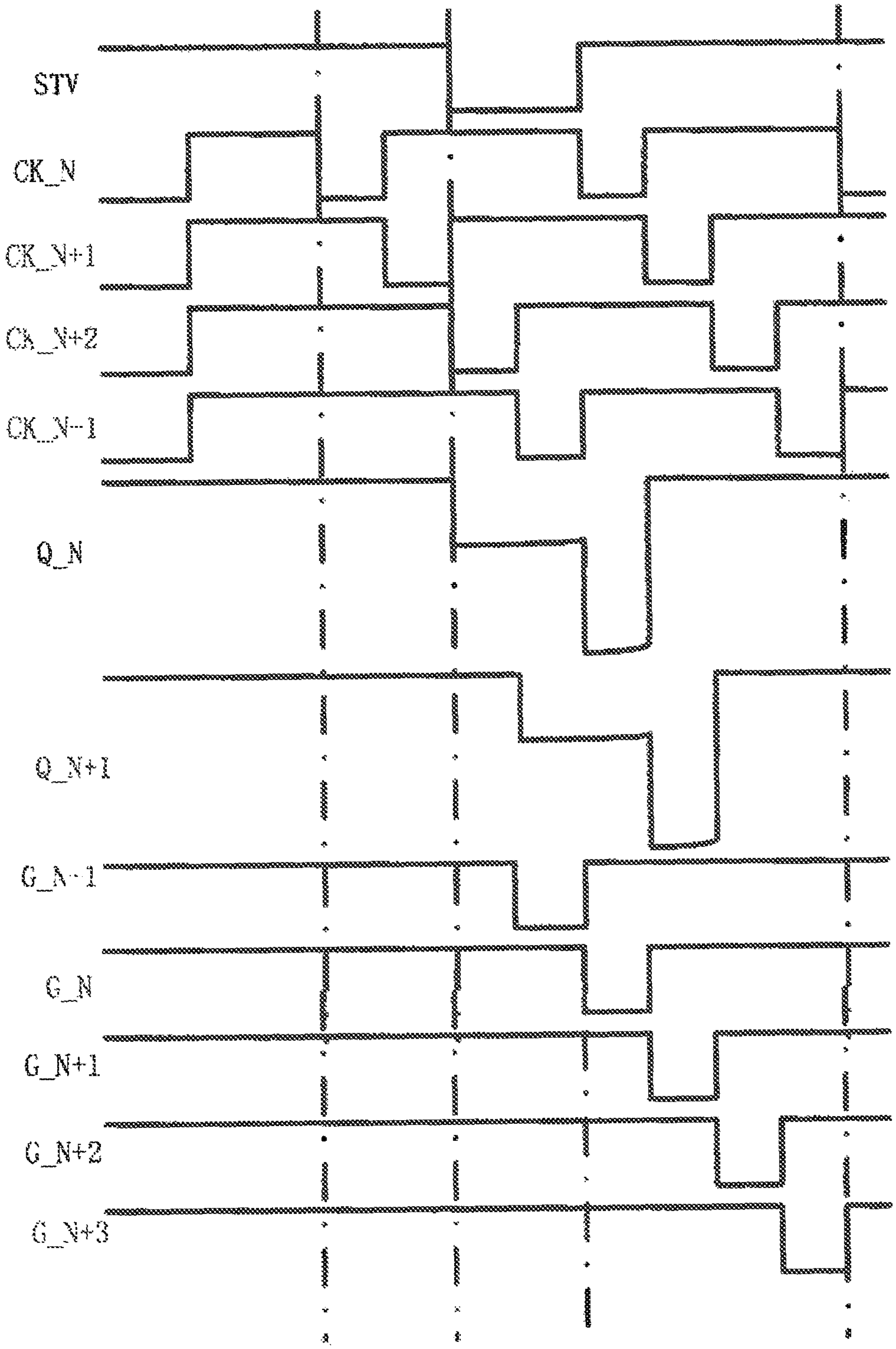
FIG. 4 is a signal waveform diagram of the scan driving circuit of the preferable embodiment of the present invention.

The specific working principle of the scan driving circuit of this preferable embodiment will be described below accompanying FIG. 2 and FIG. 4. FIG. 4 is a signal waveform diagram of the scan driving circuit of the preferable embodiment of the present invention, wherein each cycle comprises four clock signals CK_N. That is, the waveform of the CK_N is same as the waveform of the CK_N+4. Firstly, the former stage outputs a scan signal G_N−1 having the low voltage level, and the first transistor PT1 of the pull-down controlling module 11 is turned on under the control of the scan signal D2U having the low voltage level. Hence, the output end of the first transistor PT1 outputs the scan signal G_N−1 from the former stage into the input end and the control end of the second transistor PT2 of the pull-down module 12.

The low voltage level signal G_N−1 is inputted into the control end of the second transistor PT2 of the pull-down module 12, and the second transistor PT2 is thus turned on, and the low voltage level signal G_N−1 is outputted by the output end of the second transistor PT2.

The control end of the sixth transistor PT6 of the resetting module 14 receives the low voltage level signal G_N−1 outputted by the output end of the second transistor PT2, and the sixth transistor PT6 is thus turned on. The control end of the fifth transistor PT5 and the control end of the seventh transistor PT7 are respectively connected with the constant high voltage level source VGH via the sixth transistor PT6. Therefore, the fifth transistor PT5 and the seventh transistor PT7 are turned off.

The ninth transistor PT9 of the electric leakage-preventive module 16 is turned on under the control of the constant low voltage level source VGL. The low voltage level signal G_N−1 outputted by the second transistor PT2 of the pull-down module 12 passes through the ninth transistor PT9 to the first bootstrap capacitor C1, so that the voltage level of the Q_N is decreased, the Q_N is therefore outputs a low voltage level signal. In the meanwhile, the eighth transistor PT8 of the downward-transmitting module 15 is turned on under the control of the Q_N. The eighth transistor PT8 outputs the clock signal CK_N having the low voltage level of the current stage by the output end thereof to a scan line of the former stage in the drive circuit.

When the clock signal CK_N+1 of the next stage is converted to the low voltage level, the clock signal CK_N+1 from the next stage is inputted into the third transistor PT3 of the reset-controlling module 13 under the control of the scan signal U2D, and the output end of the third transistor PT3 outputs the clock signal CK_N+1 (i.e., the reset signal) to the resetting module 14.

The fourth transistor PT4 of the resetting module 14 is turned on under the control of the reset signal. The constant low voltage level source VGL passes through the fourth transistor PT4 to the control end of the fifth transistor PT5 and the control end of the seventh transistor PT7, so that the fifth transistor PT5 and the seventh transistor PT7 are turned on. The high voltage level signal from the constant high voltage level source VGH passes through the fifth transistor PT5 to the Q point so as to pull up the Q_N. Moreover, the high voltage level signal of the constant high voltage level source VGH passes through the seventh transistor PT7 to the G_N so as to pull up the G_N. Since the eighth transistor PT8 is turned off, the clock signal CK_N is converted to the high voltage level.

Thus, the outputting process of the scan signals connected in series of the low voltage level of the scan driving circuit 10 in this preferable embodiment is accomplished.

Preferably, the voltage level on the control end of the fifth transistor PT5 and the control end of the seventh transistor PT7 can be advantageously pulled up by setting the second bootstrap capacitor C2 of the resetting module 14, thereby ensuring that the Q_N point is kept at the low voltage level.

Preferably, in this preferable embodiment, the pull-down controlling module 11 further comprises an eleventh transistor PT11. The scan signal having the low voltage level is inputted into a control end of the eleventh transistor PT11. The scan signal G_N+1 from the next stage in inputted into an input end of the eleventh transistor PT11. An output end of the eleventh transistor PT11 is connected with the pull-down module 12. Thus, the pull-down controlling module 11 can receive the scan signal G_N+1 from the next stage and generate the scan voltage signal having the low voltage level of the corresponding scan line according to the scan signal G_N+1 from the next stage.

In this preferable embodiment, the reset-controlling module 13 further comprises a twelfth transistor PT12. The scan signal having the low voltage level is inputted into a control end of the twelfth transistor PT12. The clock signal CK_N−1 is inputted into an output end of the twelfth transistor PT12. Thus, the reset-controlling module 13 can receive the clock signal CK_N−1 from the former stage and generate the reset signal of the corresponding scan line.

Accordingly, in this preferable embodiment, the scan driving circuit 10 can implement a reverse scan function by using the eleventh transistor PT11 and the twelfth transistor PT12.

Preferably, in this preferable embodiment, P-type metal-oxide semiconductor transistors are utilized in the scan driving circuit 10 to control the pull-down controlling module 11, the pull-down module 12, the reset-controlling module 13, and the resetting module 14. Alternatively, N-type metal-oxide semiconductor transistors also can be utilized to control the pull-down controlling module 11, the pull-down module 12, the reset-controlling module 13, and the resetting module 14.

In the scan driving circuit of the present invention, by setting the pull-down controlling module and the reset-controlling module, the reliability of the scan driving circuit is increased, and the structure of the scan driving circuit is simplified.

Figure 3:
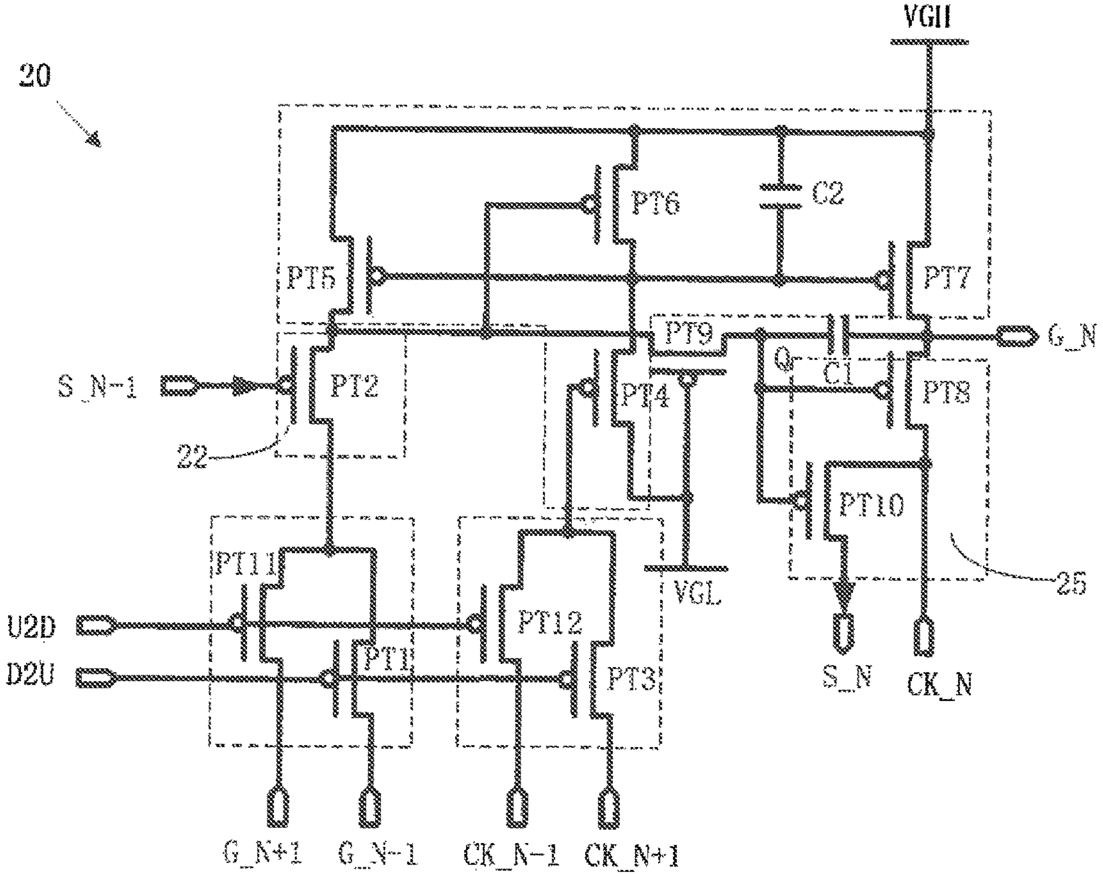
FIG. 3 is a circuit structure diagram of the scan driving circuit of a second preferable embodiment of the present invention.

Please refer to FIG. 3, which is a circuit structure diagram of the scan driving circuit of a second preferable embodiment of the present invention. In this preferable embodiment, the scan driving circuit 20 is on the base of the first preferable embodiment, in which a control end of a second transistor PT2 of a pull-down module 22 is connected with a pull-down controlling signal S_N−1 from the former stage. A downward-transmitting module 25 further comprises a tenth transistor PT10. A control end of the tenth transistor PT10 is connected with an output end of the second transistor PT2 via the ninth transistor PT9. An input end of the tenth transistor PT10 is connected with an output end of an eighth transistor PT8. A pull-down controlling signal S_N of a current stage is outputted by an output end of the tenth transistor PT10.

In the scan driving circuit 20 of this preferable embodiment, the transmitting time of the scan signal in each stage can be delaying by the pull-down controlling signal S_N, thereby preventing a current leakage problem caused by mismatching between the scan signal and the clock signal.

Thus, in the scan driving circuit of this preferable embodiment, the reliability and the stability of the scan driving circuit are further increased.

In the scan driving circuit of the present invention, by setting the pull-down controlling module and the reset-controlling module, the reliability of the scan driving circuit is increased, and the structure of the entire scan driving circuit is simplified so as to solve the technical problems that the conventional scan driving circuit has a complex structure and low reliability.

The above descriptions are merely preferable embodiments of the present invention, but are not intended to limit the scope of the present invention. Any modification or replacement made by those skilled in the art without departing from the spirit and principle of the present invention should fall within the protection scope of the present invention. Therefore, the protection scope of the present invention is subject to the appended claims.

What is claimed is:

1. A scan driving circuit for driving scan lines connected in series, comprising:

a pull-down controlling module for receiving a scan signal from a former stage and generating a scan voltage signal having a low voltage level with respect to a scan line according to the scan signal from the former stage;

a pull-down module for pulling down the scan signal with respect to the scan line according to the scan voltage signal;

a reset-controlling module for receiving a clock signal from a next stage and generating a reset signal with respect to the scan line according to the clock signal from the next stage;

a resetting module for pulling up the scan signal with respect to the scan line according to the reset signal;

a downward-transmitting module for generating and transmitting a clock signal of a current stage and a pull-down controlling signal of the current stage according to the scan signal of the scan line;

a first bootstrap capacitor for generating the scan voltage signal either having the low voltage level or a high voltage level of the scan line;

a constant low voltage level source for providing a low voltage level signal; and a constant high voltage level source for providing a high voltage level signal, wherein either P-type metal-oxide semiconductor transistors or N-type metal-oxide semiconductor transistors are utilized in the scan driving circuit to control the pull-down controlling module, the pull-down module, the reset-controlling module, and the resetting module;

the pull-down controlling module is also used for receiving a scan signal from the next stage and generating the scan voltage signal having the low voltage level with respect to the scan line according to the scan signal from the next stage; and the reset-controlling module is also used for receiving a clock signal from the former stage and generating the reset signal with respect to the scan line according to the clock signal from the former stage;

wherein the pull-down controlling module comprises a first transistor; a scan signal having a low voltage level is inputted into a control end of the first transistor; the scan signal from the former stage is inputted into an input end of the first transistor; and an output end of the first transistor is connected with the pull-down module;

wherein the pull-down module comprises a second transistor; a control end of the second transistor is connected with the output end of the first transistor of the pull-down controlling module; an input end of the second transistor is connected with the output end of the first transistor of the pull-down controlling module; and the scan voltage signal having the low voltage level of the scan line is outputted by an output end of the second transistor;

wherein the reset-controlling module comprises a third transistor; the scan signal having the low voltage level is inputted into a control end of the third transistor; the clock signal from the next stage is inputted into an input end of the third transistor; and the reset signal of the scan line is outputted by an output end of the third transistor;

wherein the resetting module comprises a fourth transistor, a fifth transistor, a sixth transistor, and a seventh transistor;

a control end of the fourth transistor is connected with the output end of the third transistor; an input end of the fourth transistor is connected with the constant low voltage level source; and an output end of the fourth transistor is respectively connected with a control end of the fifth transistor, a control end of the seventh transistor, and an output end of the sixth transistor;

an input end of the fifth transistor is connected with the constant high voltage level source; and an output end of the fifth transistor is connected with the output end of the second transistor;

a control end of the sixth transistor is connected with the output end of the second transistor; and an input end of the sixth transistor is connected with the constant high voltage level source; and an input end of the seventh transistor is connected with the constant high voltage level source; and the scan signal of the current stage of the scan line is outputted by an output end of the seventh transistor.

2. The scan driving circuit as claimed in claim 1, wherein the downward-transmitting module comprises an eighth transistor; a control end of the eighth transistor is connected with the output end of the second transistor; an input end of the eighth transistor is connected with the output end of the seventh transistor; and the clock signal of current stage is outputted by an output end of the eighth transistor.

3. The scan driving circuit as claimed in claim 2, wherein the downward-transmitting module further comprises a tenth transistor; a control end of the tenth transistor is connected with the output end of the second transistor; an input end of the tenth transistor is connected with the output end of the eighth transistor; and the pull-down controlling signal of the current stage is outputted by an output end of the tenth transistor.

4. The scan driving circuit as claimed in claim 3, wherein an end of the first bootstrap capacitor is connected with the output end of the second transistor; and another end of the first bootstrap capacitor is connected with the output end of the seventh transistor.

5. The scan driving circuit as claimed in claim 4, wherein the scan driving circuit further comprises an electric leakage-preventive module; the electric leakage-preventive module comprises a ninth transistor; a control end of the ninth transistor is connected with the constant low voltage level source; an input end of the ninth transistor is connected with the output end of the second transistor; and an output end of the ninth transistor is connected with the output end of the seventh transistor via the first bootstrap capacitor.

6. The scan driving circuit as claimed in claim 5, wherein the resetting module further comprises a second bootstrap capacitor; an end of the second bootstrap capacitor is connected with the constant high voltage level source; and another end of the second bootstrap capacitor is connected with the output end of the fourth transistor.

7. A scan driving circuit for driving scan lines connected in series, comprising:

a pull-down controlling module for receiving a scan signal from a former stage and generating a scan voltage signal having a low voltage level with respect to a scan line according to the scan signal from the former stage;

a pull-down module for pulling down the scan signal with respect to the scan line according to the scan voltage signal;

a reset-controlling module for receiving a clock signal from a next stage and generating a reset signal with respect to the scan line according to the clock signal from the next stage;

a resetting module for pulling up the scan signal with respect to the scan line according to the reset signal;

a downward-transmitting module for generating and transmitting a clock signal of a current stage and a pull-down controlling signal of the current stage according to the scan signal of the scan line;

a first bootstrap capacitor for generating the scan voltage signal either having the low voltage level or a high voltage level of the scan line;

a constant low voltage level source for providing a low voltage level signal; and a constant high voltage level source for providing a high voltage level signal;

wherein the pull-down controlling module comprises a first transistor; a scan signal having a low voltage level is inputted into a control end of the first transistor; the scan signal from the former stage is inputted into an input end of the first transistor; and an output end of the first transistor is connected with the pull-down module;

wherein the pull-down module comprises a second transistor; a control end of the second transistor is connected with the output end of the first transistor of the pull-down controlling module; an input end of the second transistor is connected with the output end of the first transistor of the pull-down controlling module; and the scan voltage signal having the low voltage level of the scan line is outputted by an output end of the second transistor;

wherein the reset-controlling module comprises a third transistor; the scan signal having the low voltage level is inputted into a control end of the third transistor; the clock signal from the next stage is inputted into an input end of the third transistor; and the reset signal of the scan line is outputted by an output end of the third transistor;

wherein the resetting module comprises a fourth transistor, a fifth transistor, a sixth transistor, and a seventh transistor;

a control end of the fourth transistor is connected with the output end of the third transistor; an input end of the fourth transistor is connected with the constant low voltage level source; and an output end of the fourth transistor is respectively connected with a control end of the fifth transistor, a control end of the seventh transistor, and an output end of the sixth transistor;

an input end of the fifth transistor is connected with the constant high voltage level source; and an output end of the fifth transistor is connected with the output end of the second transistor;

a control end of the sixth transistor is connected with the output end of the second transistor; and an input end of the sixth transistor is connected with the constant high voltage level source; and an input end of the seventh transistor is connected with the constant high voltage level source; and the scan signal of the current stage of the scan line is outputted by an output end of the seventh transistor.

8. The scan driving circuit as claimed in claim 7, wherein the downward-transmitting module comprises an eighth transistor; a control end of the eighth transistor is connected with the output end of the second transistor; an input end of the eighth transistor is connected with the output end of the seventh transistor; and the clock signal of current stage is outputted by an output end of the eighth transistor.

9. The scan driving circuit as claimed in claim 8, wherein the downward-transmitting module further comprises a tenth transistor; a control end of the tenth transistor is connected with the output end of the second transistor; an input end of the tenth transistor is connected with the output end of the eighth transistor; and the pull-down controlling signal of the current stage is outputted by an output end of the tenth transistor.

10. The scan driving circuit as claimed in claim 9, wherein an end of the first bootstrap capacitor is connected with the output end of the second transistor; and another end of the first bootstrap capacitor is connected with the output end of the seventh transistor.

11. The scan driving circuit as claimed in claim 10, wherein the scan driving circuit further comprises an electric leakage-preventive module; the electric leakage-preventive module comprises a ninth transistor; a control end of the ninth transistor is connected with the constant low voltage level source; an input end of the ninth transistor is connected with the output end of the second transistor; and an output end of the ninth transistor is connected with the output end of the seventh transistor via the first bootstrap capacitor.

12. The scan driving circuit as claimed in claim 11, wherein the resetting module further comprises a second bootstrap capacitor; an end of the second bootstrap capacitor is connected with the constant high voltage level source; and another end of the second bootstrap capacitor is connected with the output end of the fourth transistor.

* * * * *